United States Patent
Cotterill et al.

(10) Patent No.: US 8,577,321 B2
(45) Date of Patent: Nov. 5, 2013

(54) METHODS FOR SELECTING ANTENNAS TO AVOID SIGNAL BUS INTERFERENCE

(75) Inventors: Peter C. Cotterill, Mountain View, CA (US); Robert W. Schlub, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 39 days.

(21) Appl. No.: 12/959,258

(22) Filed: Dec. 2, 2010

(65) Prior Publication Data

US 2012/0142296 A1 Jun. 7, 2012

(51) Int. Cl.
*H04B 1/06* (2006.01)

(52) U.S. Cl.
USPC .............. 455/277.1; 455/403; 455/401.1; 455/557; 343/702

(58) Field of Classification Search
USPC ........................................ 455/277.1
See application file for complete search history.

(56) References Cited

U.S. PATENT DOCUMENTS

| | | |
|---|---|---|
| 2004/0018814 A1 | 1/2004 | Lin et al. |
| 2006/0109067 A1 | 5/2006 | Shtrom |
| 2007/0123207 A1 | 5/2007 | Terlizzi |
| 2009/0295648 A1 * | 12/2009 | Dorsey et al. ............ 343/702 |
| 2010/0194647 A1 | 8/2010 | Man et al. |
| 2010/0231476 A1 * | 9/2010 | Chiang et al. ............ 343/780 |
| 2011/0065392 A1 | 3/2011 | Chung et al. |

FOREIGN PATENT DOCUMENTS

| | | |
|---|---|---|
| EP | 1098454 | 5/2001 |
| EP | 1215893 | 6/2002 |
| JP | 2006279649 | 10/2006 |
| WO | 2006042399 | 4/2006 |

* cited by examiner

*Primary Examiner* — Ajibola Akinyemi
(74) *Attorney, Agent, or Firm* — Treyz Law Group; G. Victor Treyz; Jason Tsai

(57) ABSTRACT

Electronic devices may have multiple antennas. A first antenna may be located at one end of a device and a second antenna may be located at another end of the device. An input-output port in a device may have a connector that receives a mating connector associated with external equipment. The input-output port and the second antenna may be located at one of the ends of the electronic device. When equipment such as an external video accessory is in use, input-output circuitry in an electronic device may transmit high speed data signals through the input-output port. The presence of activity on the input-output port such as video data or other data transmissions may be monitored by control circuitry in the electronic device. When input-output port activity is detected, use of the second antenna in receiving radio-frequency signals can be inhibited.

19 Claims, 3 Drawing Sheets

METHODS FOR SELECTING ANTENNAS TO AVOID SIGNAL BUS INTERFERENCE

BACKGROUND

This relates to electronic devices with wireless circuitry, and more particularly, to techniques for using antennas in an electronic device so as to avoid potential interference.

Electronic devices such as cellular telephones include wireless circuitry. Input-output ports may be used to connect electronic devices with wireless circuitry to accessories. For example, many devices include ports to which a user may connect an audio-video accessory such as a display.

When a device communicates with an external accessory such as a display, high-speed data signals are transmitted and received by the device. As these high-speed signals pass through the input-output port of the device, circuitry that is adjacent to the input-output port may be affected. In particular, if an antenna is located within the vicinity of the input-output port, the antenna may pick up electromagnetic interference from the input-output port.

The electromagnetic interference may be sufficiently strong to disrupt normal device operation. For example, a cellular telephone receiver that is coupled to the antenna may be so overwhelmed with interference that the cellular telephone receiver will be unable to detect incoming cellular telephone calls or may drop an existing call.

It would therefore be desirable to be able to provide improved ways in which to avoid the effects of electromagnetic interference in a wireless electronic device that communicates using input-output ports.

SUMMARY

Wireless electronic devices such as cellular telephones, computers, and other electronic equipment may have multiple antennas. One antenna may be located at one end of a device and another antenna may be located at another end of the device. An input-output port in a device may have a connector that receives a mating connector associated with external equipment. The input-output port may be used to convey high speed data signals for the external equipment. The high speed signals may, for example, include video signals for displaying video images on the external equipment.

An electronic device may have control circuitry that monitors activity on the input-output port. The control circuitry can determine when the input-output port is in use, when the input-output port is being used to transmit data at high data rates, when the input-output port is being used to transmit video signals or other bandwidth-intensive data, or when the input-output port is otherwise being used to handle more than a predetermined amount of activity.

Activity on the input-output port may generate electromagnetic interference for a given one of the antennas, due to the proximity of that antenna and the input-output port. To ensure that the electronic device can receive signals properly during use of the input-output port, the control circuitry may inhibit use of the given antenna to receive incoming radio-frequency signals whenever activity on the input-output port is detected. When the control circuitry determines that the input-output port is handling less than the predetermined amount of activity, the given antenna can be used for receiving signals. For example, the control circuitry can use both of the antennas in a receive antenna diversity mode whenever inactivity on the input-output port is detected.

Further features of the invention, its nature and various advantages will be more apparent from the accompanying drawings and the following detailed description of the preferred embodiments.

DETAILED DESCRIPTION

Figure 1:
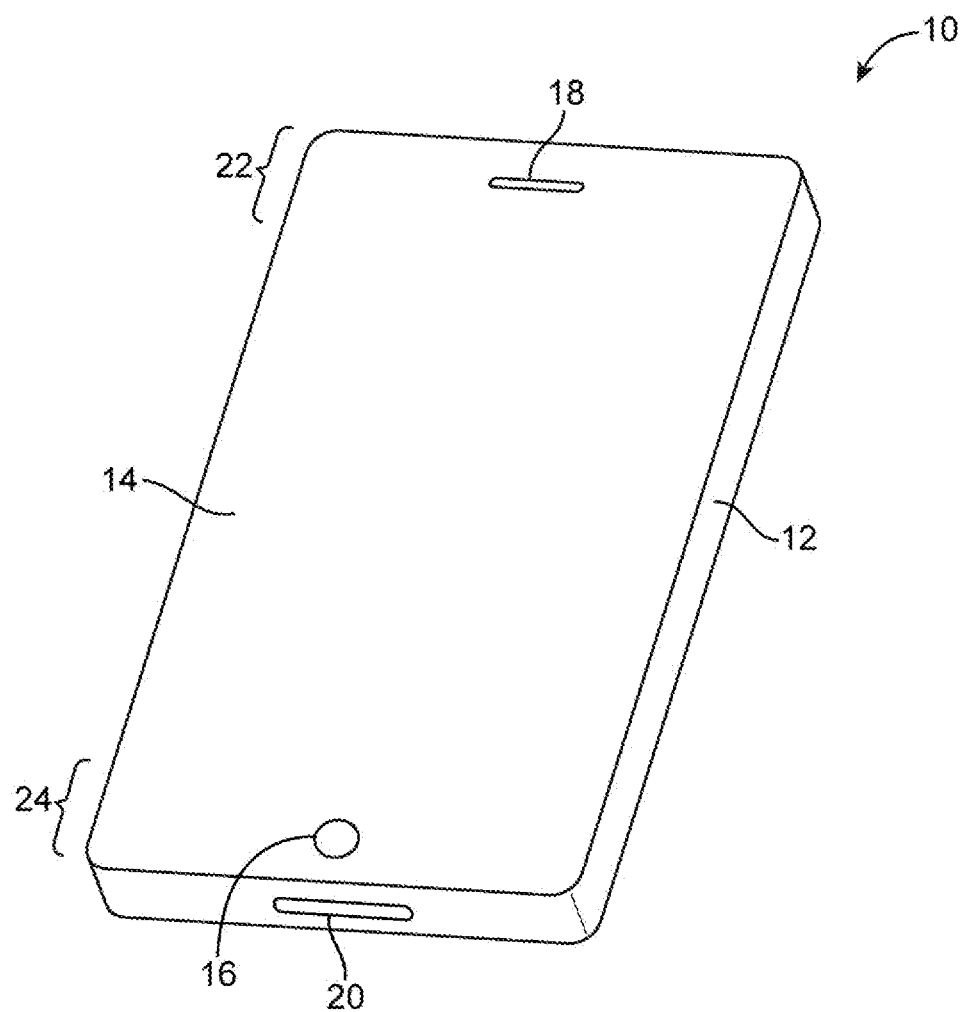
FIG. 1 is a perspective view of an illustrative electronic device in which circuitry may be configured to ensure that electromagnetic interference does not disrupt device operation when an input-output port in the device is active in accordance with an embodiment of the present invention.

An illustrative electronic device that may be operated so as to avoid interference from activity on input-output ports is shown in FIG. 1. Electronic devices such as illustrative electronic device 10 of FIG. 1 may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1, device 10 includes housing 12. Housing 12, which is sometimes referred to as a case, may be formed of materials such as plastic, glass, ceramics, carbon-fiber composites and other composites, metal, other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass member may cover the surface of display 14. Buttons such as button 16 may pass through openings in the cover glass. Openings may also be formed in the cover glass of display 14 to form a speaker port such as speaker port 18.

Openings in housing 12 may be used to form input-output ports, microphone ports, speaker ports, button openings, etc. For example, opening 20 may be used to form an input-output port that receives a connector on a cable. The connector may be, for example, a 30-pin data connector or other suitable data connector.

Wireless communications circuitry in device 10 may be used to form remote and local wireless links. The wireless communications circuitry may include one or more antennas. Single band and multiband antennas may be used. For example, a single band antenna may be used to handle local area network communications at 2.4 GHz (as an example) or a multiband antenna may be used to handle local area network communications at 2.4 GHz and at 5 GHz. As another example, a multiband antenna may be used to handle cellular telephone communications in multiple cellular telephone bands. Antennas may also be used to receive global positioning system (GPS) signals at 1575 MHz in addition to cellular telephone signals and/or local area network signals. Other types of communications links may also be supported using single-band and multiband antennas.

Antennas may be located at any suitable locations in device 10. For example, one antenna may be located in an upper region such as region 22 at the upper end of an elongated device housing and another antenna may be located in a lower region such as region 24 at the lower end of an elongated device housing. If desired, antennas may be located along device edges, in the center of a rear planar housing portion, in device corners, etc.

Antennas in device 10 may be used to support any communications bands of interest. For example, device 10 may include antenna structures for supporting local area network communications (e.g., IEEE 802.11 communications at 2.4 GHz and 5 GHz for wireless local area networks), signals at 2.4 GHz such as Bluetooth® signals, voice and data cellular telephone communications (e.g., cellular signals in bands at frequencies such as 850 MHz, 900 MHz, 1800 MHz, 1900 MHz, 2100 MHz, etc.), global positioning system (GPS) communications at 1575 MHz or other satellite navigation system communications, signals at 60 GHz (e.g., for short-range links), etc.

Figure 2:
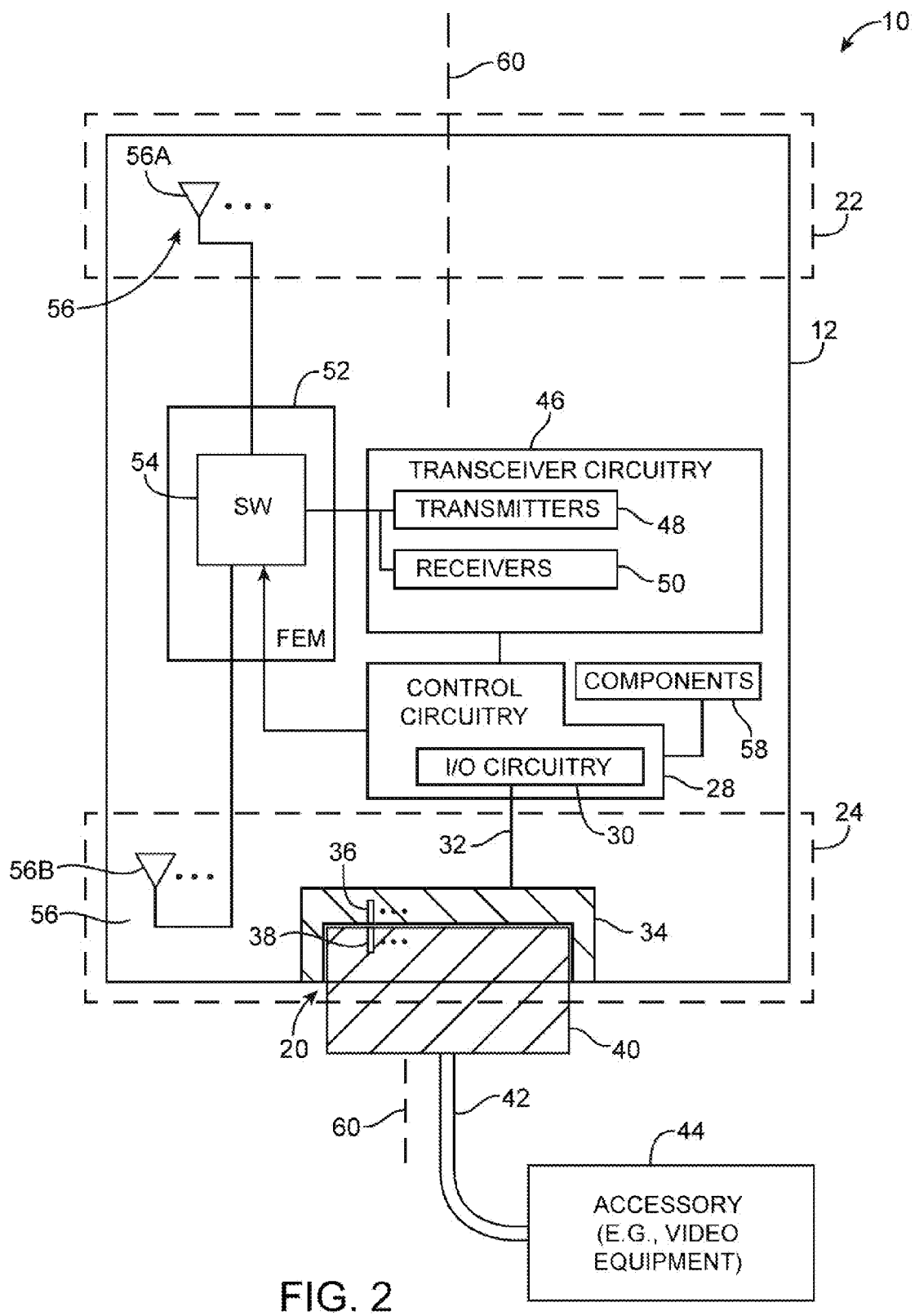
FIG. 2 is a circuit diagram of an electronic device in accordance with an embodiment of the present invention.

A schematic diagram showing illustrative components that may be used in device 10 of FIG. 1 is shown in FIG. 2. As shown in FIG. 2, device 10 may include control circuitry 28. Control circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 28 may be used to control the operation of device 10. This processing circuitry may be based on one or more microprocessors, microcontrollers, digital signal processors, baseband processors, application specific integrated circuits, etc.

Control circuitry 28 may be used to run software on device 10 such as internet browsing applications, voice-over-internet-protocol (VoIP) telephone call applications, email applications, media playback applications, operating system functions, etc. To support interactions with external equipment, control circuitry 28 may be used in implementing communications protocols. Communications protocols that may be implemented using control circuitry 28 include internet protocols, Universal Serial Bus (USB) protocols and other serial link protocols, protocols for conveying data over parallel buses, protocols for conveying analog data signals, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Control circuitry 28 may include input-output circuitry 30. Input-output circuitry 30 may be coupled to input-output port connector 34. Input-output circuitry 30 may include digital communications circuitry for supporting communications over one or more serial links (e.g., a single serial link or multiple parallel lanes in a multi-lane communications path), digital communications circuitry for supporting communications over a parallel bus, analog communications circuitry, video circuitry (e.g., a video display driver circuit for driving video signals onto a display such as an external computer monitor or television), and other suitable input-output circuitry.

Connector 34 may mate with a corresponding connector that is associated with external equipment. For example, connector 34 may mate with a connector such as connector 40 that is part of external equipment such as accessory or that is connected to external equipment via cable 42. Cable 42 may be pigtailed to accessory 44 or may have a connectors at both ends (e.g., one connector such as connector 40 may be used in connecting cable 42 to device 10 and another connector may be used in connecting cable 42 to accessory 44). Connectors such as connectors 34 and 40 may have mating contacts such as input-output pins 36 on connector 34 and input-output pins 38 on connector 40. Connectors 34 and 40 may be 30-pin data connectors, Universal Serial Bus (USB) connectors, audio jack connectors, IEEE 1394 connectors, external serial advanced technology (eSATA) connectors, High Definition Multimedia Interface (HDMI) connectors, DisplayPort connectors, or other data connectors.

Accessory 44 may be a computer display, a television display, a display associated with other equipment, a storage device, an input-output device, audio-video equipment such as a stereo system, a wireless device (e.g., an external wireless local area network adapter), a communications device (e.g., an Ethernet adapter), or other electronic equipment. Accessory 44 may include one or more integrated circuits or other circuitry for interfacing with input-output circuitry 30. For example, accessory 44 may include video display circuitry that receives video signals from input-output circuitry 30 and that displays corresponding video content on a display within accessory 44 or associated with accessory 44. In configurations in which accessory 44 is a communications device or storage device, accessory 44 may include circuitry for receiving data from input-output circuitry that is to be communicated or stored by accessory 44. If desired, accessory 44 may be an adapter that serves an interface between device 10 and external equipment. For example, accessory 44 may be a video adapter that receives image data from device 10 and that drives corresponding video signals into an attached external display (as an example). Accessory 44 may, in general, be any electrical equipment.

Control circuitry 28 may be coupled to transceiver circuitry 46 and other components 58. Components 58 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Transceiver circuitry 46 may include one or more transmitters 48 and one or more receivers 50. Device 10 may use radio-frequency transceiver circuitry 46 in handling communications in radio-frequency communications bands such as cellular telephone communications bands, wireless local area network bands, satellite navigation system bands, and other wireless communications bands. The transmitters and receivers of transceiver circuitry 46 may handle the 2.4 GHz and 5 GHz bands for WiFi® (IEEE 802.11) communications bands and the 2.4 GHz Bluetooth® communications band. Circuitry 46 may use cellular telephone transceiver circuitry for handling wireless communications in cellular telephone bands such as the bands at 850 MHz, 900 MHz, 1800 MHz, 1900 MHz, and 2100 MHz (as examples). Circuitry 46 may include a Global Positioning System (GPS) receiver for receiving GPS signals at 1575 MHz and may include satellite navigation system circuitry for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles. If desired, circuitry 46 may handle other wireless communications bands (e.g., a 60 GHz band, radio and television bands, etc.).

Transceiver circuitry 46 may be coupled to antennas 56 by front end module (FEM) circuitry 52 or other suitable control circuitry. Circuitry 52 may include matching circuits, switches, filters, power amplifiers, low noise amplifiers, and other circuitry. Switching circuitry such as switching circuitry (switch) 54 may be used to selectively couple antennas 56 to the transmitter and receiver circuitry of transceiver circuitry 46. For example, in a configuration in which there are two antennas in device 10 such as upper antenna 56A and lower antenna 56B, switching circuitry 54 may be used to select which of antennas 56 is serving as a main or primary antenna for device 10. The other (secondary) antenna need not be used or may be used only occasionally to determine whether or not the antenna assignments in device 10 should be swapped to improve performance. This type of arrangement may be used, for example, in implementing a receiver diversity scheme. Receiver (receive) diversity schemes can also be implemented by coupling each antenna in device 10 to a respective receiver and selectively activating the receivers for use in receiving appropriate signals during data reception operations.

With a receiver diversity scheme, control circuitry 28 (e.g., a baseband processor) may measure the signal quality for received signals from the primary antenna (and, if desired, the secondary antenna and other antennas in device 10, if available). Examples of signal quality measurements that may be made include received power measurements, frame error rate measurements, bit error rate measurements, signal-to-noise ratio measurements, adjacent channel leakage measurements, etc. Based on this measured antenna performance data, control circuitry 28 can decide whether to continue with its current antenna assignments or whether performance would likely be improved by swapping the primary and secondary antennas using switch 54 or otherwise adjusting which antenna structures are being used in receiving signals. If, for example, measurements indicate that antenna 56B is beginning to perform poorly as the primary antenna, switch 54 can be configured to switch antenna 56A into use as the primary antenna or appropriate receiver circuitry 50 may be adjusted to receive signals from antenna 56A while inactivating receiver capabilities for antenna 56B). This type of diversity arrangement may be used for received signals only (receive diversity), for transmitted signals only (e.g., transmit diversity), or may involve for both receiver and transmitter diversity. If desired, the scheme used for receiving antennas may be different than the scheme used for transmitting signals. For example, antenna 56B might, in some situations, be inactivated for receiving signals while continuing to be used for transmitting signals.

Antennas 56 may be formed using any suitable antenna types. For example, antennas 56 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

With one suitable arrangement, device 10 may have antennas in regions of device 10 such as upper region 22 and lower region 24. One or more upper antennas for device 10 such as antenna 56A may be formed in region 22. One or more lower antennas for device 10 such as antenna 56B may be formed in region 24. In devices with a compact rectangular form factor (e.g., handheld devices that are elongated along a longitudinal axis such as axis 60), antennas 56A and 56B may be located at opposing ends of the elongated device housing. In devices with other form factors such as laptop and tablet computers, wearable devices, computer monitors with integrated computers, etc., antennas may be located in other suitable regions (e.g., at the four corners of a rectangular device, on front and back surfaces, along edge regions of a device, in one or more arrays, etc.). There may be any suitable number of antennas 56 in device 10 (e.g., two or more, three or more, four or more, five or fewer, etc.).

The location of antennas 56 relative to input-output ports such as port 20 can give rise to a potential for electromagnetic interference. Port 20 and its associated connectors such as connectors 34 and 40 and input-output pins such as pins 36 and 38), may, for example, tend to radiate non-negligible amounts of electromagnetic interference when port 20 is in use. The amount of interference that is produced and the spectral composition of the radio-frequency interference signals may depend on the type of communications being handled by port 20. For example, if port 20 is only conveying relatively slow signals such as direct-current (DC) data signals or fixed power signals, relatively minimal amounts of interference may be generated. On the other hand, if data is transmitted at a higher rate, radio-frequency signals may be generated in port 20 that couple to one or more of antennas 56, particularly antennas 56 that are located in the vicinity of port 20, such as lower antenna 56B of FIG. 2.

In a typical scenario, path 32, connectors 34 and 40 of port 20, and cable 42 may carry one or two lanes of serial data at a data rates of 1.6 Gbps or 2.7 Gbps (e.g., when carrying video data to a display accessory). Data may, for example, be conveyed by operating one lane at 1.6 Gbps. More data may be conveyed by using a higher data rate. For example, more data may be conveyed per unit time by operating one of the lanes at 2.7 Gbps or by operating two lanes simultaneously at 1.6 Gbps each. Additional bandwidth may be provided by operating both lanes at 2.7 Gbps. In situations such as these, the digital data transmission operations associated with using data port 20 may lead to interference that can adversely affect the performance of the receiver (i.e., receiver circuitry 50) that is receiving radio-frequency antenna signals from antenna 56B. Interference from high speed data (e.g., data being conveyed through port 20 at tens or hundreds of Mbps or more or Gbps or more) may, for example, cause interference with cellular telephone bands, local area network bands, satellite navigation system bands, etc.

If excessive radio-frequency interference is coupled from port 20 to an antenna such as antenna 56B, device 10 may not be able to use antenna 56B to receive signals satisfactorily. For example, incoming cellular telephone calls may not be received or, if a call is currently being received by antenna 56B, interference from use of data port 20 may cause the call to be dropped. If interference is sufficiently strong, receiver circuitry 50 and control circuitry 28 may not be able to perform signal measurement operations to detect that antenna performance has degraded. For example, if interference is significant, incoming calls may not be properly received and control circuitry 28 may not be aware that received signal quality is poor (i.e., because no incoming signals are being received and analyzed to determine their frame error rate or to evaluate other performance metrics). When control circuitry 28 is unaware that performance is poor, control circuitry 28 may not be able to adjust switching circuitry 54 to switch upper antenna 56A into use in place of lower antenna 56B. Device 10 may therefore become locked in an inoperative state in which incoming wireless signals cannot be properly received so long as interference-producing data (e.g., high-speed data) is being conveyed through port 20.

To avoid undesirable situations such as these, device 10 can monitor the status of port 20 for activity that might lead to interference. The amount of activity that is considered to be sufficient to warrant corrective action may be established by a default or user-adjustable setting. Any activity on port 20 may be considered to be sufficient to warrant action or any data transmission activities may be considered to be sufficient to warrant action. A threshold activity level (e.g., a threshold data transmission rate or other predetermined activity level) may also be used in determining whether port 20 is active enough to warrant corrective action.

As an example, device 10 can monitor the status of port 20 to determine whether data is being transmitted at a rate that is sufficient to cause interference. If, for example, port 20 is inactive (i.e., because connector 40 is not present or because no data or power is being conveyed over contacts 36 and 38), control circuitry 28 can conclude that there is no potential for data-induced electromagnetic interference with transceiver circuitry 46. If, as another example, port 20 is active, but is transmitting data at a relatively low data rate (e.g., below 5 Mbps), control circuitry 28 can conclude (based on previous test characterization measurements) that the impact of the data flow through port 20 will be negligible.

In other situations, control circuitry 28 can identify data transmission situations that have the potential to cause undesirable interference. If, as an example, control circuitry 28 determines that input-output circuitry 28 is being used (or is about to be used) to transmit data with a high data rate (e.g., over 100 Mbps, over 1 Gbps, over 2 Gbps, etc), control circuitry 28 can proactively configure the wireless circuitry of device 10 to ensure that signals can continue to be received successfully. If, for example, device 10 is operating in a receive diversity mode in which switch 54 is being continually adjusted to ensure that an optimal one of antennas 56A and 56B is in use to receive signals, control circuitry 28 can transition from the receive diversity mode to a single antenna mode in which only antenna 56A is being used to gather signals receive circuitry 50 (i.e., by adjusting receivers 50 so as to inactivate antenna 56B for the purpose of receiving signals). In a device 10 in which only antenna 56B is being used to receive signals (i.e., if antenna 56B is being used in a static or nearly static antenna configuration), detection of potentially interfering activity on port 20 by control circuitry 28 may cause control circuitry 28 to switch to using only antenna 56A to receive signals.

In systems in which each antenna has a respective receiver 50, antenna selection operations can be performed by selectively activating and deactivating appropriate receivers. If desired, switching circuitry 54 may also be used in determining which antenna is being used in device 10.

Figure 3:
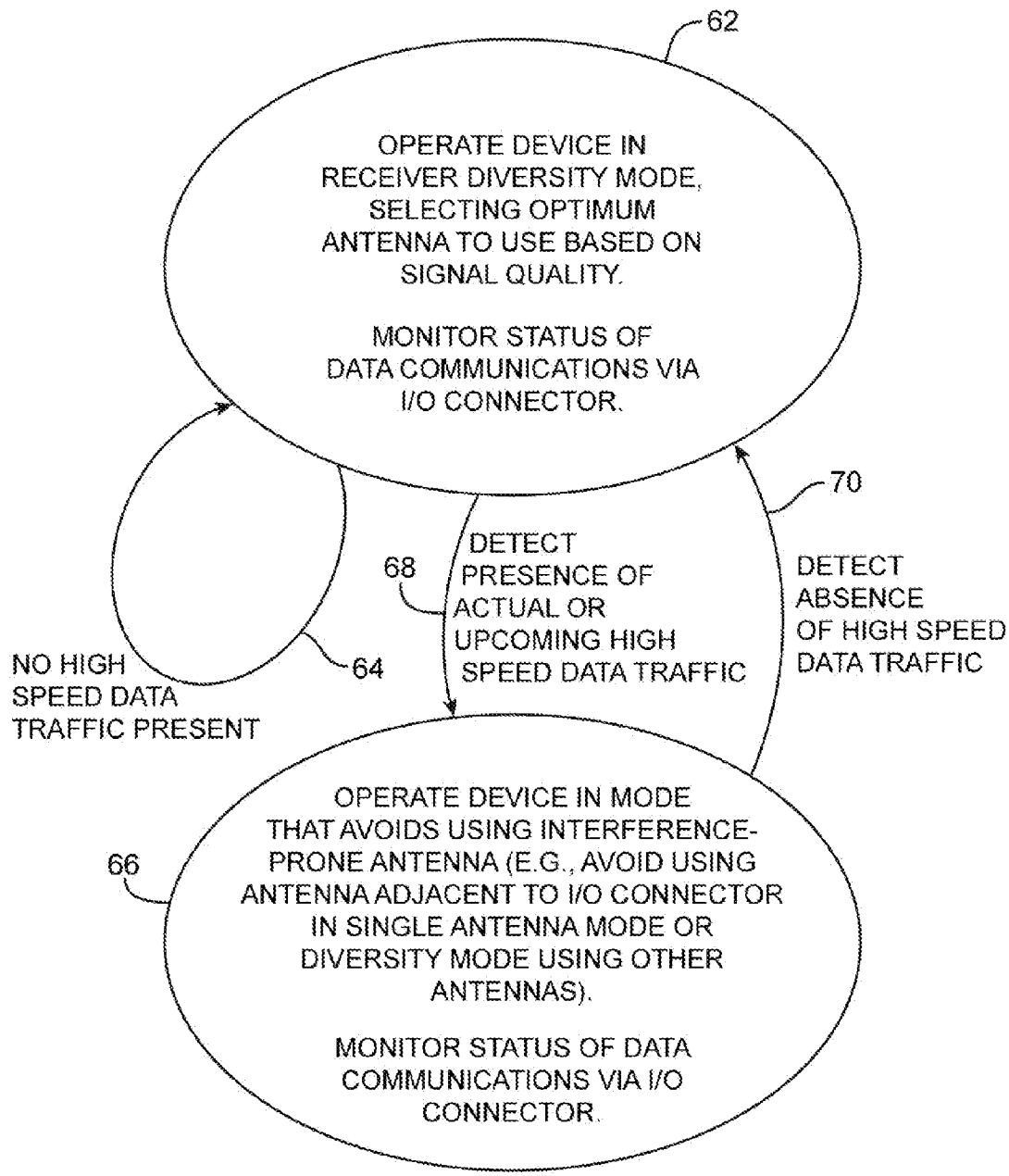
FIG. 3 is diagram of illustrative steps involved in operating a device of the types shown in FIGS. 1 and 2 in accordance with an embodiment of the present invention.

Illustrative steps involved in operating a device such as device 10 of FIG. 2 in a wireless network are shown in FIG. 3.

Initially, device 10 may be operated in a first wireless communications mode (represented by state 62 in FIG. 3) in which at least one antenna is being used that can potentially be affected by data port interference. For example, device 10 may be operated in a single antenna mode in which only primary antenna 56B is being used (or is primarily being used) to handle wireless signals (e.g., to transmit and/or receive signals). If desired, device 10 may be operated in an antenna diversity mode during step 62 in which multiple antennas are being used (e.g., in a TX/RX diversity mode in which an optimum antenna to handle both transmission and reception operations is being continuously selected or an RX diversity mode in which an optimum antenna to handle data reception operations is being continuously selected).

In diversity-type operating modes, control circuitry 28 may monitor signal quality from the active antenna and/or may periodically or continuously make signal quality measurements with one or more alternative antennas to determine which antenna is optimal for use in handling wireless signals. With one illustrative diversity scheme, control circuitry 28 can use real time signal quality measurements (e.g., frame error rate measurements, received and transmitted signal power measurements, etc.) to determine which antenna from a set of two or more antennas such as antennas 56A and 56B is the optimal antenna to be used in receiving wireless signals and can select that optimum antenna for use while using a fixed antenna (e.g., antenna 56B) as the primary or only antenna for transmitting antenna signals. Other antenna operating schemes may be used during the first operating mode (mode 62) if desired. These are merely illustrative examples.

During the operations of the first mode, there is a potential for interference to be produced due to the use of input-output port 20. When, for example, video signals or other data signals with relatively high data rates are transmitted through input-output port 20, one or more of the antennas in device 10 may pick up electromagnetic interference from port 20. The affected antennas may include, for example, an antenna such as antenna 56B of FIG. 2 that is located in the vicinity of port 20. As shown by dashed line 24, the footprint of antenna 56B may overlap some or all of input-output port 20, which tends to make antenna 56B sensitive to radio-frequency interference from port 20.

To detect whether antenna 56B will be affected by interference, control circuitry 28 may, during the operations of mode 62, monitor whether or not device 10 is transmitting and/or receiving signals through input-output port 20. Control circuitry 28 may, for example, monitor operating system functions, application software status information, or hardware-generated signals to determine whether signals are flowing through pins 36 and 38 that can potentially cause electromagnetic interference. The interference may arise, for example, from digital signals that have an associated data rate above a predetermined threshold.

Control circuitry 28 can conclude that interference is likely to affect wireless operations (e.g., signal reception through antenna 56B) based on any suitable criteria. For example, control circuitry 28 can determine that interference will possibly affect wireless communications whenever connector 40 is plugged into connector 34, whenever port 20 is active in handling power and/or data signals, when a data communications function is activated in response to invocation of an operating system function or an application function, when data communications of a particular type are detected on port 20 such as when video data is being transmitted, when data of more than a particular bandwidth is being transmitted through port 20 such as data of more than 100 Mbps, more than 500 Mbps, more than 1 Gbps, more than 2.0 Gbps, more than 2.5 Gbps, or more than another suitable high-speed data rate threshold, etc.

Control circuitry 28 can detect the presence of interference-producing communications through port 20 in real time as interference-producing communications begin to flow through port 20 or may detect the presence of such interference in advance by monitoring associated device operations.

For example, control circuitry 28 can detect the imminent use of port 20 by an application or other system function that is preparing port 20 for use.

Control circuitry 28 can therefore detect the presence of interference-producing signals at a point in time that is somewhat before the point in time at which the signals are actually generated. As an example, there may be a delay of a fraction of a second or less (or seconds or more) between the point in time at which control circuitry 28 can definitively or reasonably conclude that the interference-producing signals will flow through port 20 and the point in time in which the signals flowing through port 20 actually begin to impair the proper functioning of the antenna in the vicinity of port 20 such as antenna 56B of FIG. 2.

So long as port 20 is inactive or so long as no interference-producing signaling activities in port 20 are detected by control circuitry 28, device 10 may continue to operate in mode 62, as indicated by line 64 of FIG. 3. Control circuitry 28 can control the operation of circuitry such as front-end module circuitry 52, switching circuitry 54, and transceiver circuitry 46 so that an appropriate antenna is switched into use (e.g., so that the stronger of antennas 56A and 56B is switched into use based on measured signal quality when using RX diversity).

If, while operating in mode 62, control circuitry 28 detects that port 20 is generating interference or is about to generate interference (e.g., if control circuitry 28 detects that port 20 is being used or is about to be used to transmit high speed data signals or otherwise is producing interference or has an immediate potential for producing interference), device 10 may transition to a second mode of operation (mode 66), as indicated by line 68. The process of switching from the first mode of operation to the second mode of operation may be triggered by any suitable level of activity in input-output port 20 (e.g., detection that the amount of activity in input-output port 20 has exceeded a predetermined amount such as a predetermined data rate threshold of 1 Gbps, that input-output port 20 has exceeded a predetermined amount of activity by virtue of being in use rather than being inactive, that input-output port 20 has exceeded a predetermined amount of activity by virtue of transmitting video data, etc.).

In the second mode of operation (mode 66), device 10 may use an antenna or antennas that are not affected by interference from input-output port 20 and may inhibit use of the antenna (or antennas) that are affected by interference for receiving signals. If, for example, device 10 has two antennas such as upper antenna 56A and lower antenna 56B, device 10 may deactivate lower antenna 56B during the operations of mode 66 or may use antenna 56B only for transmitting signals and not for receiving signals. As an example, control circuitry 28 may adjust switching circuitry 54 so that antenna 56A is coupled to an appropriate receiver in receivers 50 to receive radio-frequency signals or control circuitry 28 may inactivate a receiver in receivers 50 that is associated with antenna 56B while activating a receiver in receivers 50 that is associated with antenna 56A.

Whenever operating device 10 in a mode in which antenna 56B is not used in receiving radio-frequency signals, antenna 56A may be used in receiving radio-frequency signals and antenna 56A (and/or antenna 56B) may be used in transmitting data signals. When use of antenna 56B in receiving signals has been inhibited by control circuitry 28 and transceiver circuitry 46 in this way, interference from use of input-output port 20 will not disrupt normal operation of device 10. Incoming calls and other data can be received using the other antenna resources of device 10 such as antenna 56A.

If there are three or more antennas 56 in device 10, all but the antenna (or antennas) that are influenced by the operation of port 20 may be used in receiving incoming radio-frequency signals (e.g., in a receive diversity arrangement or MIMO arrangement), any given single antenna may be used in receiving incoming radio-frequency signals, or subset of antennas other than antenna 56B may be used in receiving antenna signals. Radio-frequency signal transmissions may be performed during mode 66 using one antenna, using all but the antenna adjacent to port 20 (or all antennas in device 10) in an antenna diversity or MIMO scheme, etc.

During the operations of second mode 66, control circuitry 28 may monitor the status of input-output port 20. Control circuitry 28 may, for example, access operating system status information, application status information, hardware status information, or other information that is indicative or whether or not signals are being conveyed through input-output port 20 that may produce interference for antenna 56B. Control circuitry 28 may, for example, determine whether or not input-output port 20 is being used or may determine whether or not video signals or other high-speed data is being transmitted through port 20. If it is determined that input-output port 20 is not being used or if it is determined that input-output port 20 is not carrying video signals or other high speed data signals that have the potential to cause interference with the operation of antenna 56B in receiving incoming radio-frequency signals (i.e., in response to detection of inactivity on port 20), control circuitry 28 can return device 10 to the operations of mode 62, as indicated by line 70.

As indicated by the state diagram of FIG. 3, device 10 can toggle back and forth between modes 62 and 66 during operation. If, for example, a user does not have any accessories or other external equipment plugged into input-output port 20 of device 10 or if input-output port 20 is otherwise not being used to convey data, device 10 can remain in mode 62 and all antennas in device 10 can be used in receiving signals, including antenna 56B (when appropriate). Whenever control circuitry 28 detects that use of port 20 may impair the operation of antenna 56B in receiving incoming radio-frequency signals, antenna 56B can be inactivated for purposes of receiving incoming radio-frequency signals and antenna 56A or other antenna resources in device 10 can be used in receiving incoming radio-frequency signals (mode 66). Whenever port 20 is no longer being used to transmit high frequency signals, device 10 can toggle back to mode 62.

The foregoing is merely illustrative of the principles of this invention and various modifications can be made by those skilled in the art without departing from the scope and spirit of the invention.

What is claimed is:

1. An electronic device, comprising:
   an input-output data port that is adapted to receive an external connector;
   at least first and second antennas, wherein the first antenna is located farther from the input-output port than the second antenna; and
   radio-frequency transceiver and control circuitry that inhibits use of the second antenna in receiving radio-frequency signals by monitoring the rate at which data signals are being transmitted through the input-output data port.

2. The electronic device defined in claim 1 wherein the radio-frequency transceiver and control circuitry is configured to inhibit the use of the second antenna in response to determining that data signals are being transmitted through the input-output data port at a data rate exceeding a predetermined data rate.

3. The electronic device defined in claim 1 wherein the radio-frequency transceiver and control circuitry is configured to receive signals from the first and second antennas in an antenna diversity mode in response to inactivity on the input-output data port.

4. The electronic device defined in claim 1 wherein the electronic device comprises a cellular telephone, wherein the first antenna comprises an upper cellular telephone antenna at an upper end of the cellular telephone, and wherein the second antenna comprises a lower cellular telephone antenna at a lower end of the cellular telephone antenna.

5. The electronic device defined in claim 4 wherein the input-output data port comprises a 30-pin data port.

6. The electronic device defined in claim 4 wherein the radio-frequency transceiver and control circuitry comprises input-output circuitry that is configured to transmit video signals through contacts in the input-output port and wherein the radio-frequency transceiver and control circuitry is configured to inhibit use of the second antenna in receiving radio-frequency signals whenever the input-output port is transmitting the video signals.

7. A method of operating an electronic device that has at least first and second antennas and an input-output data port having a connector that is adapted to receive a mating external connector, comprising:
    in a first mode of operation, using at least the second antenna to receive radio-frequency signals;
    in a second mode of operation, using only the first antenna to receive radio-frequency signals; and
    switching from the first mode of operation to the second mode of operation in response to detection of use of the input-output port to transmit data.

8. The method defined in claim 7 wherein switching from the first mode of operation to the second mode of operation comprises switching from the first mode of operation to the second mode of operation in response to detection of use of the input-output port to transmit video data.

9. The method defined in claim 7 wherein switching from the first mode of operation to the second mode of operation comprises switching from the first mode of operation to the second mode of operation in response to detection of use of the input-output port to transmit data at a data rate in excess of a predetermined threshold data rate and wherein the predetermined threshold data rate is greater than 1 Gbps.

10. The method defined in claim 7 further comprising:
    in the first mode of operation, using both the first and second antennas in receiving radio-frequency signals in a diversity antenna mode.

11. An electronic device, comprising:
    first and second antennas;
    an input-output data port having a connector that is configured to receive a mating external connector; and
    radio-frequency transceiver and control circuitry that is coupled to the first and second antennas, wherein the radio-frequency transceiver and control circuitry includes input-output circuitry that is operable to transmit data signals through the input-output data port, wherein the radio-frequency transceiver and control circuitry monitors the input-output data port for activity, and wherein the radio-frequency transceiver and control circuitry is configured to inhibit use of the second antenna in receiving radio-frequency signals by monitoring an amount of data that is being transmitted through the input-output data port.

12. The electronic device defined in claim 11 wherein the connector of the input-output data port comprises a 30-pin connector.

13. The electronic device defined in claim 12 wherein the electronic device comprises has opposing ends and wherein the second antenna and the 30-pin connector are located at one of the ends of the electronic device.

14. The electronic device defined in claim 12 wherein the electronic device comprises a cellular telephone having an upper end in which the first antenna is located and a lower end in which the second antenna and the 30-pin connector are located.

15. The electronic device defined in claim 11 wherein the electronic device comprises a cellular telephone having an upper end at which the first antenna is located and a lower end at which the second antenna is located.

16. The electronic device defined in claim 15 wherein the radio-frequency transceiver and control circuitry is configured to receive radio-frequency signals from the first antenna while inhibiting use of the second antenna.

17. The electronic device defined in claim 16 wherein the radio-frequency transceiver and control circuitry is configured to receive radio-frequency signals from the second antenna in response to detection of a lack of interference-producing data signals flowing through the input-output data port.

18. The electronic device defined in claim 11 wherein the radio-frequency transceiver and control circuitry is configured to receive radio-frequency signals from the first antenna while inhibiting use of the second antenna.

19. The electronic device defined in claim 11 wherein the transceiver and control circuitry is configured to receive radio-frequency signals from the second antenna in response to detection of a lack of interference-producing data signals flowing through the input-output data port.

* * * * *